(No Model.)
G. H. GUNDERSON.
BICYCLE LOCK.
No. 565,537. Patented Aug. 11, 1896.
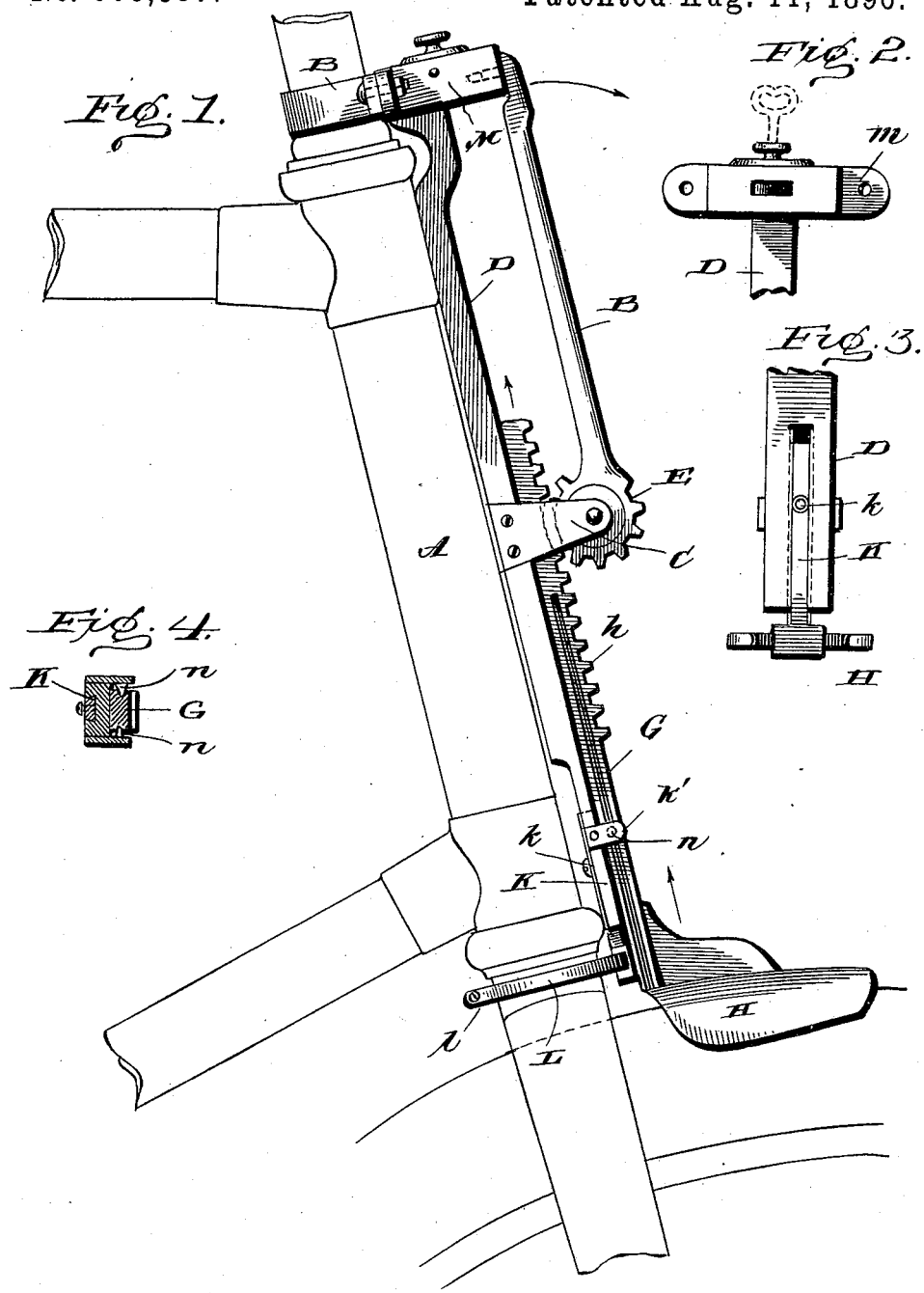
Witnesses:
L. C. Hill
A. L. Hough
Inventor:
G. H. Gunderson
by Franklin H. Hough
Atty.

UNITED STATES PATENT OFFICE.

GUSTAV H. GUNDERSON, OF CHICAGO, ILLINOIS.

BICYCLE-LOCK.

SPECIFICATION forming part of Letters Patent No. 565,537, dated August 11, 1896.

Application filed April 25, 1896. Serial No. 589,087. (No model.)

*To all whom it may concern:*

Be it known that I, GUSTAV H. GUNDERSON, a citizen of the United States, residing at Chicago, in the county of Cook and State of Illinois, have invented certain new and useful Improvements in Bicycle-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in locks for bicycles, and especially to a novel means for holding a brake-shoe tightly against the tire of the wheel by a rack-and-pinion attachment, suitable provision being made to lock the end of the pinion-carrying arm to the head of the wheel.

A further part of the invention resides in the construction of a rack-and-pinion attachment, whereby the brake-shoe may be tightly pressed against the tire, and in the construction of the locking mechanism of such a nature as to allow of its ready adjustment to various wheels, the invention being detachably held to the head of the wheel.

To these ends and to such others as the invention may pertain the same consists, further, in the novel construction, combination, and adaptation of the parts, as will be hereinafter more fully described, and then specifically defined in the appended claims.

The invention is clearly illustrated in the accompanying drawings, which, with the letters of reference marked thereon, form a part of this specification, and in which drawings similar letters of reference indicate like parts throughout the several views, in which—

Figure 1 is a side elevation of a portion of the frame of a bicycle, showing my improved locking attachment connected thereto. Fig. 2 is a detail view showing a lock to be operated with a key. Fig. 3 is a detail view of the adjusting-bracket for holding the locking device. Fig. 4 is a detail view in section.

Reference now being had to the details of the drawings by letter, A designates the head of the bicycle, and C are plates which are secured to the bar D, the upper end of which is secured to the handle-bar post by the band B. Between the said plates C is pivoted the pinion-head E, integral with the handle B'.

G is a rack-bar having teeth $h$, which are designed to mesh with the teeth of the pinion-head. At the lower end of the said bar G is attached the brake-shoe H. On the rear side of the bar G, working in a dovetailed recess in the bar D, is the adjustable plate or bar K, and at its lower end is secured the band L, the ends of which are held together by means of the bolt $l$. This band serves to hold the rack-bar to the frame of the bicycle directly above the fork. A suitable adjusting-screw $k$ passes through the plate K, and engages the bar D to hold said plate in an adjusted position. At right angles to the sides of the plate K are the ears $k'$, carrying lugs $n$, the ends of which travel in and form guides for the rack-bar.

Secured to the upper end of the bar D is a lock M, which may be equipped with a combination-lock, or a lock of any other style, in which the upper end of the lever B may be locked.

Having thus described my invention, what I claim to be new, and desire to secure by Letters Patent, is—

1. A bicycle-lock consisting of a rack-bar having a brake-shoe secured at its lower end, slidingly held to the head of the bicycle, combined with a pinion-head, pivoted between extensions of a bar fastened to the frame of the bicycle, and having an integral arm or handle, means for locking the said handle, the teeth of the rack-bar and pinion adapted to mesh, substantially as shown and described.

2. In a bicycle-locking mechanism, the combination with the bar D, held to the head of the bicycle, the pinion-head pivoted between extensions on said bar, of the rack-bar G, having teeth meshing with the teeth of the pinion-head, an adjustable plate K slidingly held in a recess in the lower end of the bar D, and connected at its lower end to the bicycle-head, and having guide-lugs designed to work in recesses in the sides of the rack-bar G, substantially as shown and described.

3. In combination with the rack-bar and pinion meshing therewith, the integral handle B having a hook at its upper end, the lock M in which the said hook may be held, substantially as shown and described.

In testimony whereof I affix my signature in presence of two witnesses.

GUSTAV H. GUNDERSON.

Witnesses:
O. M. OLSON,
CHAS. WULFF.